US010326667B2

(12) United States Patent
Jones et al.

(10) Patent No.: US 10,326,667 B2
(45) Date of Patent: *Jun. 18, 2019

(54) SYSTEM AND METHOD FOR GROUP CONTROL IN A METAVERSE APPLICATION

(71) Applicant: International Business Machines Corporation, Armonk, NY (US)

(72) Inventors: Angela Richards Jones, Durham, NC (US); Ruthie D Lyle, Durham, NC (US); Vandana Mallempati, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 466 days.

This patent is subject to a terminal disclaimer.

(21) Appl. No.: 14/594,892

(22) Filed: Jan. 12, 2015

(65) Prior Publication Data

US 2015/0128062 A1 May 7, 2015

Related U.S. Application Data

(63) Continuation of application No. 11/971,575, filed on Jan. 9, 2008, now Pat. No. 8,990,707.

(51) Int. Cl.
*G06F 3/048* (2013.01)
*H04L 12/24* (2006.01)
(Continued)

(52) U.S. Cl.
CPC ............ *H04L 41/22* (2013.01); *G06N 3/006* (2013.01); *H04L 65/403* (2013.01)

(58) Field of Classification Search
CPC ........ H04L 41/22; H04L 65/403; G06N 3/006
(Continued)

(56) References Cited

U.S. PATENT DOCUMENTS

| 5,546,557 | A | 8/1996 | Allen et al. |
| 6,785,708 | B1 * | 8/2004 | Busey ............... G06Q 30/02 709/204 |

(Continued)

FOREIGN PATENT DOCUMENTS

JP 2001-249876 A 9/2001

OTHER PUBLICATIONS

Nagata et al. "Enzin : A Communication Tool with Instant Access Control" IPSJ Journal, Information Processing Society of Japan, vol. 48, No. 3, (Mar. 15, 2007), pp. 1134-1143.

*Primary Examiner* — Tadesse Hailu
*Assistant Examiner* — Darrin Hope
(74) *Attorney, Agent, or Firm* — Kunzler, PC; Bruce R. Needham

(57) ABSTRACT

A metaverse system includes a client computer coupled to a network, a metaverse server coupled to the client computer, the metaverse server to host a metaverse application, and a group link engine coupled to the server. The engine opens a group link connection in response to a request from a user. A linked group associated with the connection includes at least two linked users, and at least one of the linked users is designated as a leader, and each of the at least two linked users is associated with an avatar different from the avatar associated with the other. The engine includes a group link controller to allow the leader to control an action of a second avatar of a second user. The action of the second avatar can be viewed separately from each avatar associated with the at least one linked users that are designated as the leader.

13 Claims, 8 Drawing Sheets

(51) Int. Cl.
*G06N 3/00* (2006.01)
*H04L 29/06* (2006.01)

(58) Field of Classification Search
USPC .................................................. 715/740, 753
See application file for complete search history.

(56) References Cited

U.S. PATENT DOCUMENTS

| | | | | |
|---|---|---|---|---|
| 2005/0164795 A1* | 7/2005 | Whitten | ................... | A63F 13/10 463/44 |
| 2006/0135237 A1* | 6/2006 | Tsuda | ...................... | A63F 13/10 463/9 |
| 2007/0207860 A1* | 9/2007 | Yamauchi | ............... | A63F 13/12 463/42 |

* cited by examiner

ND METHOD FOR GROUP
SYSTEM AND METHOD FOR GROUP CONTROL IN A METAVERSE APPLICATION

CROSS-REFERENCE TO RELATED APPLICATIONS

This application is a continuation of U.S. application Ser. No. 11/971,575, filed on Jan. 9, 2008, which is incorporated by reference herein in its entirety.

BACKGROUND OF THE INVENTION

The term metaverse is widely used to describe a fully immersive 3D virtual space, which includes a virtual environment where humans are represented by an avatar. In this way, users may interact with other users, both socially and economically, through their respective avatars and with software agents in a cyber space. The virtual environment in a metaverse is built upon a metaphor of the real world, but in most cases, without the physical limitations of the real world. In a metaverse application, such as Second Life®, users are allowed to have friends, create groups, and talk and mingle with strangers, fly, and teleport to different locations, and different metaverses.

On occasion a user may want to group together with other users and travel through the metaverse application as a group. For example, avatar A, avatar B, and avatar C may want to go to an event together. Each user's avatar can travel to the event under the control of the individual user. Alternatively, the user of avatar A can control their avatar to go to the event and then send invitations to the users of avatar B and avatar C, asking them to teleport to the event to join them. Once an avatar teleports to an event at the request of another user, the avatar lands next to the other user that sent the teleport invitation. Once all of the avatars are together at an event, they may want to remain together at the event. This may include moving around at a particular location, for example, browsing a shopping mall within the metaverse.

Conventionally, each user controls his or her avatar independently of the group. In some instances, remaining as a group can be difficult to do because each user must keep track of the movements of the other user's avatars to determine the direction the group is heading. This becomes more challenging when a user in the group controls their avatar to fly or teleport to a new location. In order for the remaining users to regroup with the target avatar that teleported or flew away, each user determines the location of the target avatar that departed the group, and then each user controls their avatar to travel to the same location, although the target avatar that first departed may have since moved from that location. Alternatively, a user could request a teleport invitation, from the user that departed from the group, to teleport to the location of the user that departed. In order for a group of avatars to remain as a group, each avatar keeps track of the movements of everyone else in the group, in addition to what the group is doing at the time, such as shopping. Thus, the current solution to maintain a group of avatars in a metaverse application is limited because each member independently tries to track the locations of the other members of the group.

SUMMARY OF THE INVENTION

Embodiments of a system are described. In one embodiment, the system is a metaverse system to allow a user to control a group of avatars in a metaverse application in a group. An embodiment of the system includes a client computer coupled to a network, a metaverse server coupled to the client computer, and a group link engine coupled to the metaverse server. The metaverse server hosts a metaverse application over the network. The group link engine opens a group link connection in response to a request from a user to open the group link connection. A linked group associated with the group link connection includes at least two users linked in the group link connection. At least one of the linked users is designated as a leader of a linked group associated with the group link connection. Each of the at least two linked users is associated with an avatar different from the avatar associated with the other at least one linked user designated as the leader. The group link engine includes a group link controller to allow the leader to control an action of a second avatar of a second user. The action of the second avatar can be viewed separately from each avatar associated with the at least one linked users that are designated as the leader.

In some embodiments, the actions the leader may control include group walking, group flying, group teleporting, and group running. In some embodiments, the group link controller also allows the leader to control a group gesture. Exemplary group gestures include group hand waving, group clapping of hands, group sitting down, group laughing, and group dancing.

In some embodiments, the system also includes a group link configuration engine to send a group link invitation to another user to join a linked group. In some embodiments, the group link configuration engine links the other user to the group link connection in response to an acceptance of the invitation by the other user. In some embodiments, the group link configuration engine also sets a maximum group size limit to maintain a limit on a maximum number of users allowed to join the linked group. In some embodiments, the group link configuration engine also terminates the group link connection. In some embodiments, the group link controller stores a plurality of group movements on a storage device in response to a request from a user in a linked group to save the plurality of group movements. In some embodiments, the group link controller allows the at least one other user to decline the action that the leader initiates to control the avatar of the at least one other user. In some embodiments, the group link controller controls a group movement in response to an input command by the leader of the linked group.

In some embodiments, the group movements the leader may control include a cascaded group movement, in which a user in the linked group is ranked in a predetermined order to allow a movement initiated by the leader to be performed by the leader first, and then after a predetermined delay, the user performs that movement according to the rank of the user in the linked group. The group movements also include a delayed teleport, in which a leader teleports to a new location apart from a remainder of the linked group, and after a predetermined delay, the remainder of the linked group is then teleported to the new location. The group movements also include a verified teleport, in which a leader teleports to a new location apart from the remainder of the linked group, and the remainder of the linked group teleports to the new location in response to a verification by the leader to travel to the new location. Other embodiments of the system are also described.

Embodiments of a method are also described. In one embodiment, the method is a method for controlling a group of avatars in a metaverse application. An embodiment of the method includes opening a group link connection in response to a request from a user to open the group link connection. A linked group associated with the group link connection comprises at least two linked users. At least one of the linked users is designated as a leader of the linked group associated with the group link connection. The method also includes controlling an action of a plurality of avatars of the linked group associated with the group link connection in response to an input command by the leader of the linked group. Other embodiments of the method are also described.

Embodiments of an apparatus are also described. In one embodiment, the apparatus includes means for establishing a linked group of metaverse users, each metaverse user associated with an avatar of a metaverse application, wherein one of the metaverse users is designated as a leader of the linked group. The apparatus also includes means for controlling an action of all of the avatars of the linked group in response to an action of the avatar associated with the leader of the linked group of metaverse users, wherein the action of each avatar of the linked group can be viewed separately. Other embodiments of the apparatus are also described.

Other aspects and advantages of embodiments of the present invention will become apparent from the following detailed description, taken in conjunction with the accompanying drawings, illustrated by way of example of the principles of the invention.

BRIEF DESCRIPTION OF THE SEVERAL VIEWS OF THE DRAWINGS

Throughout the description, similar reference numbers may be used to identify similar elements.

DETAILED DESCRIPTION OF THE INVENTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments facilitate processing group link connections in a metaverse server. An exemplary metaverse server includes Second Life®. This and other metaverse servers serve a virtual world simulation, or metaverse, through a software application that may be stored and executed on a computer system.

Figure 1:
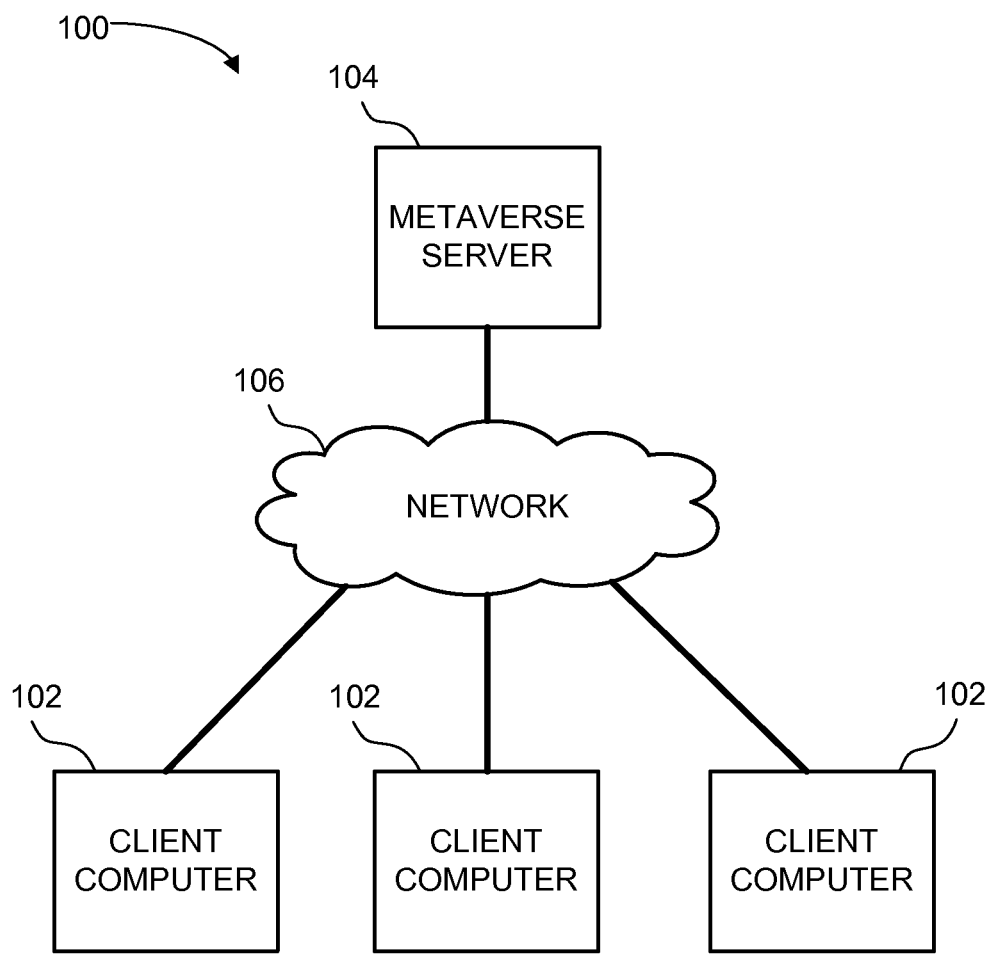
FIG. 1 depicts a schematic diagram of one embodiment of a computer network system.

FIG. 1 depicts a schematic diagram of one embodiment of a computer network system 100. The illustrated computer network system 100 includes a client computer 102, a metaverse server 104, and a network 106. The computer network system 100 may interface a system user and a metaverse server 104 according to the interface operations of the client computer 102. Although the depicted computer network system 100 is shown and described herein with certain components and functionality, other embodiments of the computer network system 100 may be implemented with fewer or more components or with less or more functionality. For example, some embodiments of the computer network system 100 include a plurality of metaverse servers 104 and a plurality of networks 106. Additionally, some embodiments of the computer network system 100 include similar components arranged in another manner to provide similar functionality, in one or more aspects.

The client computer 102 manages the interface between a system user and the metaverse server 104. In one embodiment, the client computer 102 is a desktop computer or a laptop computer. In other embodiments, the client computer 102 is a mobile computing device that allows a user to connect to and interact with a metaverse. In some embodiments, the client computer 102 is a video game console. The client computer 102 is connected to the metaverse server 104 via a local area network (LAN) or other network 106.

The metaverse server 104 hosts a simulated virtual world, or a metaverse, for a plurality of client computers 102. In one embodiment, the metaverse server 104 is an array of servers. In one embodiment, a specified area of the metaverse is simulated by a single server instance, and multiple server instances may be run on a single metaverse server 104. In some embodiments, the metaverse server 104 includes a plurality of simulation servers dedicated to physics simulation in order to manage interactions and handle collisions between characters and objects in a metaverse. The metaverse server 104 also may include a plurality of storage servers, apart from the plurality of simulation servers, dedicated to storing data related to objects and characters in the metaverse world. The data stored on the plurality of storage servers may include object shapes, avatar shapes and appearances, audio clips, metaverse related scripts, and other metaverse related objects. The plurality of storage servers may also store data associated with a group link connection, as described in greater detail below in relation to FIG. 3.

The network 106 may communicate traditional block I/O, for example, over a storage area network (SAN). The network 106 may also communicate file I/O, for example, using a transmission control protocol/internet protocol (TCP/IP) network or similar communication protocol. In some embodiments, the storage system 100 includes two or more networks 106. In another embodiment, the client computer 102 is connected directly to a metaverse server 104 via a backplane or system bus. In one embodiment, the network 106 includes a cellular network, other similar type of network, or combination thereof.

Figure 2:
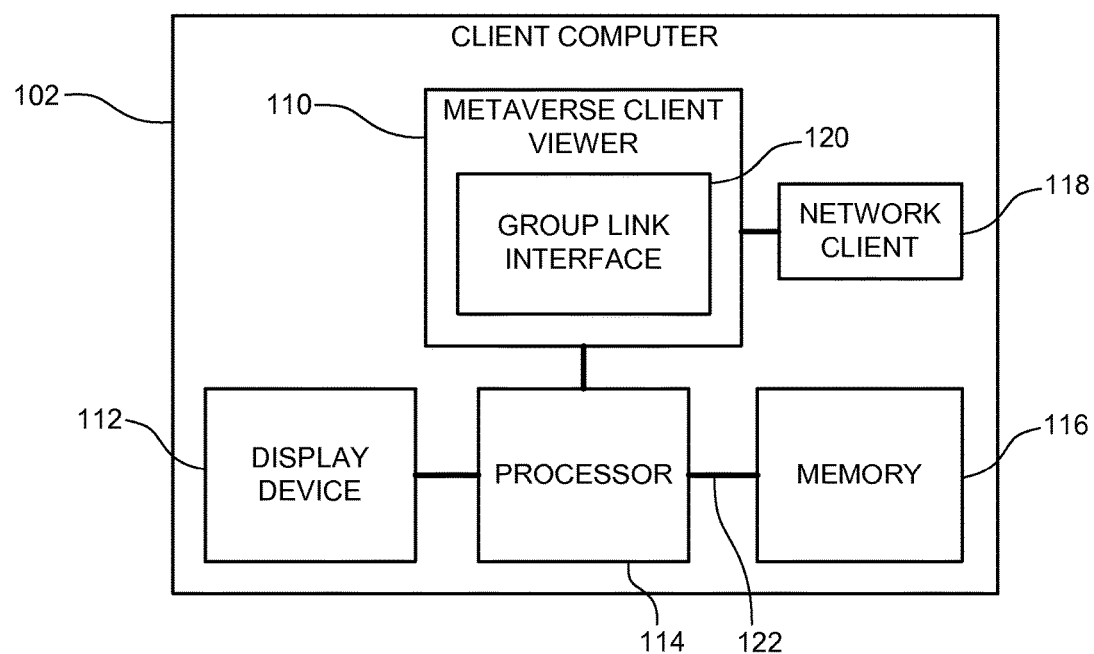
FIG. 2 depicts a schematic block diagram of one embodiment of a client computer of the computer network system of FIG. 1.

FIG. 2 depicts a schematic block diagram of one embodiment of a client computer 102 with an application to implement an interface of a metaverse. The illustrated client computer 102 includes a metaverse client viewer 110, a display device 112, a processor 114, an electronic memory device 116, a network client 118, and one or more bus interfaces 122. In one embodiment, the bus interfaces 122 facilitate communications related to software associated with the metaverse executing on the client computer 102, including processing metaverse application commands, as well as storing, sending, and receiving data packets associated with the application software of the metaverse. Although the depicted client computer 102 is shown and described herein with certain components and functionality, other embodiments of the client computer 102 may be implemented with fewer or more components or with less or more functionality.

In some embodiments, the metaverse client viewer 110 is stored as computer readable instructions in the electronic memory device 116 or a data storage device within a client computer 102. In the same embodiment, the metaverse client viewer 110 includes processes and functions which are executed on a processor 114 within a client computer 102. Alternatively, the metaverse client viewer 110 may be implemented independently of the various components of the client computer 102.

In one embodiment, the metaverse client viewer 110 is a client program executed on a client computer 102. In this embodiment, the metaverse client viewer 110 enables a user on a client computer 102 to connect to a metaverse server 104 over a network 106. The metaverse client viewer 110 is further configured to enable the user on the client computer 102 to interact with other users on other client computers 102 that are also connected to the metaverse server 104. The depicted metaverse client viewer 110 includes a group link interface 120 to allow the user to control and configure a group link connection, and interact within a metaverse virtual world as part of the group link connection. Embodiments of the group link connection are described in further detail below in relation to FIG. 3.

In some embodiments, the display device 112 is a graphical display such as a cathode ray tube (CRT) monitor, a liquid crystal display (LCD) monitor, or another type of display device. In one embodiment, the display device 112 is configured to convey a visual representation of a metaverse virtual world, as well as control and configuration tools to control and configure aspects of a group link connection that are discussed below in further detail.

In one embodiment, the processor 114 is a central processing unit (CPU) with one or more processing cores. In other embodiments, the processor 114 is a graphical processing unit (GPU) or another type of processing device such as a general purpose processor, an application specific processor, a multi-core processor, or a microprocessor. Alternatively, a separate GPU may be coupled to the display device 112. In general, the processor 114 executes one or more instructions to provide operational functionality to the computer network system 100. The instructions may be stored locally in the processor 114 or in the electronic memory device 116. Alternatively, the instructions may be distributed across one or more devices such as the processor 114, the electronic memory device 116, or another data storage device.

In some embodiments, the electronic memory device 116 is a random access memory (RAM) or another type of dynamic storage device. In other embodiments, the electronic memory device 116 is a read-only memory (ROM) or another type of static storage device. In other embodiments, the illustrated memory device 116 is representative of both RAM and static storage memory within a single computer network system 100. In other embodiments, the electronic memory device 116 is an electronically programmable read-only memory (EPROM) or another type of storage device. Additionally, some embodiments store the instructions as firmware such as embedded foundation code, basic input/output system (BIOS) code, or other similar code.

The network client 118, in one embodiment, facilitates initial connections between the client computer 102 and the metaverse server 104 in response to a user on the client computer 102 requesting to log in to the metaverse server 104 and to maintain a connection established between the client computer 102 and the metaverse server 104. In this same embodiment, the network client 118 handles communications and commands, on the client side, between the client computer 102 and the metaverse server 104. In one embodiment, the communications and commands are exchanged over the network 106.

In one embodiment, the client computer 102, the display device 112, the processor 114, the electronic memory device 116, the network client 118, and other components within the computer network system 100 are coupled together by one or more bus interfaces 122. The bus interfaces 122 may be configured for simplex or duplex communications of data, address, and/or control information.

Figure 3:
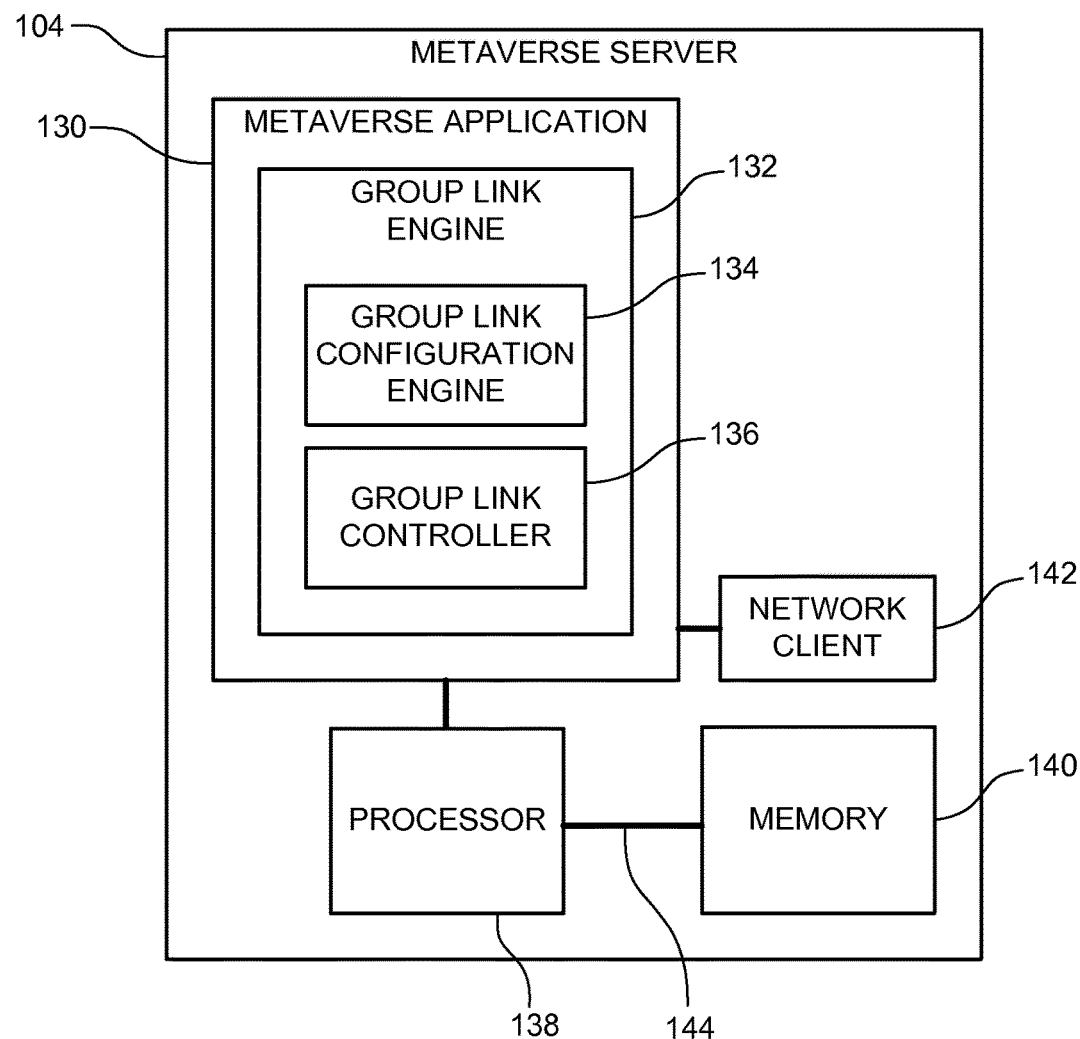
FIG. 3 depicts a schematic diagram of one embodiment of the metaverse server of the computer network system of FIG. 1.

FIG. 3 depicts a schematic diagram of one embodiment of a metaverse server 104 for use in association with the group link interface 120 of FIG. 2. The illustrated metaverse server 104 includes a metaverse application 130, a processor 138, an electronic memory device 140, a network client 142, and one or more bus interfaces 144. In one embodiment, the bus interfaces 144 facilitate communications related to execution of the metaverse application 130 on the metaverse server 104, including processing metaverse application commands, as well as storing, sending, and receiving data packets associated with the metaverse application 130. Although the depicted metaverse server 104 is shown and described herein with certain components and functionality, other embodiments of the metaverse server 104 may be implemented with fewer or more components or with less or more functionality.

In some embodiments, the metaverse client viewer 110 is stored in the electronic memory device 116 or a data storage device within a client computer 102. In the same embodiment, the metaverse application 130 includes processes and functions which are executed on a processor 138 within the metaverse server 104.

The illustrated metaverse server 104 of FIG. 3 includes many of the same or similar components as the client computer 102 of FIG. 2. These components are configured to operate in substantially the same manner described above, except as noted below.

The depicted metaverse application 130 includes a group link engine 132. In one embodiment, the metaverse application 130, when executed on a metaverse server 104, simulates a fully immersive three-dimensional virtual space, or metaverse, that a user on a client computer 102 may enter and interact within via the metaverse client viewer 110. Thus, a plurality of users, each on their own client computer 102, may interact with each other and other simulated objects within the metaverse.

The depicted group link engine 132 includes a group link configuration engine 134 and a group link controller 136. The group link engine 132 provides functionality within the metaverse application 130 to allow a plurality of avatars of different users to link themselves to each other for group travel purposes and other various group functions. The group link engine 132 allows a user to open a group link connection, link a plurality of avatars to the group link connection (i.e., to each other), and control an action of the linked group of avatars. Thus, the group link connection is the plurality of links, and any associated maintenance of those links, among the avatars. The linked group is the plurality of avatars linked together as a group.

In some embodiments, the group link connection is controlled and configured by at least one of the users, called a leader of the group link connection, linked together in the group link connection. A linked group is at least two avatars brought into such relation that the performance of one avatar influences the performance of the linked group of avatars as a whole. In particular, embodiments of the group link connection allow the leader of the group link connection to control the avatars of other users within the group link connection.

In one embodiment, a user requests, via the group link interface 120, to open a group link connection. The metaverse application 130 receives the request, and the group link engine 132 then opens the group link connection. In one embodiment, the user that makes the request to open the group link connection is automatically designated by the group link engine 132 as a leader of the group link connection.

In one embodiment, the group link configuration engine 134 configures a group link connection profile, which includes parameters related to the group link connection. In some embodiments, the group link configuration engine 134 configures the group link connection profile in response to a request from the leader of the group link connection to configure the group link connection profile. Thus, in this embodiment, a user that is part of a group link connection may interface with the group link configuration engine 134 and configure the group link configuration profile through the group link interface 120. In a further embodiment, the group link configuration engine 134 sends a group link invitation to a user, as specified by the leader, to join the linked group.

In some embodiments, the group link configuration engine 134 links the user who receives and accepts the group link invitation to join the linked group, to the group link connection. Another function of the group link configuration engine 134 may include saving the group link connection profile on the electronic memory device 116 on the client computer 102 or other type of storage device associated with the client computer 102. Alternatively, the group link connection profile may be saved on the electronic memory device 140 on the metaverse server 104 or on another type of storage device associated with the metaverse server 104. In a further embodiment, the group link connection profile may be saved on both the client computer 102 and the metaverse server 104.

In some embodiments, parameters of the group link connection profile, which may be configured by a member of the group link connection, include setting an expiration on the group link invitation, setting a maximum group size limit, and defining a user list to automatically link a user to the group link connection when that user enters the metaverse.

For example, a user may control an avatar through a metaverse client viewer 110 running on the user's client computer 102. The user may then request to open a group link connection. By initiating the group link connection, the user is designated as the leader of the group link connection. The leader may then invite other users to join the leader's linked group. If a user receives and accepts the group link invitation, the user is then linked to the group link connection and may be designated as a follower of the group link connection. In other words, the movements, including gestures, of the follower's avatar, normally controlled by the follower, are then controlled by the leader. The ability to control another user's avatar is described in more detail below. In some embodiments, the user that accepts an invitation to join a linked group is automatically teleported to the location of the leader.

In one embodiment, an invitation is terminated when a user declines a group link invitation. Alternatively, a group link invitation expires when a user waits too long to accept the group link invitation, according to the group link invitations expiration time set in the group link connection profile. Still, another user may enter the metaverse and may automatically join the linked group upon entering the metaverse, according to a user list defined in the group link connection profile. Alternatively, a user that is on the user list may enter the metaverse and, yet, might not automatically join the linked group upon entering the metaverse, according to a maximum group size limit already being reached, as set in the group link connection profile. In this case, the leader of the group link connection may reconfigure the maximum group size limit to allow an additional user to join.

In one embodiment, the group link engine 132 may implement a global maximum group size limit, similar to the group link maximum group size limit for a given group, except, the global maximum group size limit would be enforced throughout the entire metaverse as a maximum number the group link maximum group size limit may be set to. Additionally, a user in the metaverse may set a local maximum group size limit enforced for a certain simulated building, or some other type of area within the metaverse. In other words, a user in the metaverse that owns virtual property within the metaverse may only allow linked groups of ten or less linked avatars. When a linked group of eleven or more linked avatars attempts to enter that building, they would be notified that the building does not allow groups over ten linked avatars to enter.

In one embodiment, the group link configuration engine 134 may be configured to terminate the group link connection, in response to a request from the leader of the group link connection. Terminating the group link connection closes the group link connection and all associated group links between a leader and one or more followers. Alternatively, a follower of the group link connection may disconnect from the group link connection at any time, for example, by using the movement keys normally used for individual movement of an avatar, or a specially assigned key for disconnecting, or even a menu option in the group link interface 120. In some embodiments, a link to the group link connection may remain open to the follower that disconnects form the group link connection to reconnect to the group link connection without requiring a new group link invitation, so long as the group link connection has not been closed, and other settings of the group link connection profile permit the follower that disconnected to rejoin the linked group.

In one embodiment, the group link controller 136 controls a plurality of functions, also referred to as actions, of a group link connection. In some embodiments, the leader of the group link connection initiates a group link connection function through the group link interface 120 on the leader's computer client 102. Thus, in this embodiment, a user that is part of a group link connection may interface with the group link controller 136 and control the group link configuration functions through the group link interface 120.

In some embodiments, the plurality of group link actions include functions for group walking, group flying, group teleporting, group running, group voting, group purchasing, and any other action defined in a metaverse application 130. In one embodiment, the follower may decline an action on an individual basis in response to a group link action initiated by the leader. For example, a group may be going to attend a music concert and the concert may have an entrance fee. Thus, the leader of the group initiates a group purchase for the music concert, and each follower accepts or declines on an individual basis. When a follower declines the purchase, and others accept, then the follower that declines would not be admitted to the concert, and would thus be disconnected from the group link connection in response to the linked group entering the concert area with those who accept the purchase.

In one embodiment, the plurality of group link actions includes a group communication function. The communication between members of the group link connection may be private to those members of the group link connection and, thus, accessible, whether in text or audio format, to only a user that is presently linked to the group link connection. In a further embodiment, the plurality of group link actions includes a plurality of group gestures. The plurality of group gestures may include gestures for group hand wave, group clap of hands, group sit down, group laugh, group dance, any sequence of the plurality of group gestures, and any other defined group gesture.

In other words, when a user is not presently connected to a group link connection and the user initiates a function for their avatar to move or gesture, only the user's avatar moves or gestures according to the function initiated by that user. However, when a user is presently connected to a group link connection, and that user is the leader of the group link connection, and the leader of the group link connection initiates a function for their avatar to move or gesture, not only the leader's avatar moves or gestures according to the function initiated by the leader, but so does each avatar currently connected to the group link connection. Thus, the movement or gesture of the leader is translated to a movement or gesture of each member of the group as a whole, all members of the group link connection making the same movement or gesture at the same time as each other and the leader. Those users that are presently connected to the group link connection that are not designated as a leader of the group link connection are designated as a follower of the group link connection. As a follower of the group link connection, the follower does not initiate a group link action to control a movement or gesture of the linked group of avatars. The follower does not control the group link actions, but simply mimics the movements and gestures of the leader of the group link connection.

For example, after opening and configuring a group link connection, in one embodiment, two or more users are connected to the group link connection, and at least one of the users is designated as the leader of the group link connection, the leader may then initiate a group link action to group walk, group fly, group teleport to a certain location in the metaverse, or a group link action that moves the linked group to another metaverse. As the leader of the group link connection initiates a group link action, in the same way the leader would initiate an individual function of the leader's avatar in the metaverse, all other users connected to the group link connection, the followers follow and mimic the individual function initiated by the leader, without any keystroke or mouse interaction required by the followers connected to the group link connection. In other words, as the leader initiates an individual movement function, and the group link controller 136 then translates the individual function initiated by the leader of the group link connection as a group link action that is implemented by each avatar within the linked group.

Perhaps the linked group is moving to attend a university lecture or corporate meeting in a simulated lecture hall within the metaverse. The leader controls the movement of the linked group and leads the linked group to the simulated lecture hall, whether by group flying, group walking, group teleporting, or a combination thereof. Once the group is inside the lecture hall, the leader may then initiate a normal individual gesture of an individual avatar in the metaverse to sit down in a simulated chair within the lecture hall. In one embodiment, the leader leads the linked group to available chairs in the lecture hall and initiates a group sit down gesture. In other words, as the leader initiates an individual gesture, the group link controller 136 then translates the individual gesture function of the leader of the group link connection as a group gesture of the linked group as a whole. Thus, every movement that the leader initiates for the leaders individual avatar may then be substantially mimicked by an individual avatar of a user presently connected to the group link connection.

In one embodiment, the group link controller 136 may implement a cascaded group link action, similar to the group link actions described above, except the function is implemented in a cascading fashion. The leader of the group link connection initiates a group link action to group walk, group fly, group teleport, or group gesture, or any other group link action. However, instead of the group moving as a whole in unity, or at approximately the same time, in the cascaded group link action, the action of the leader avatar is followed by each avatar in the linked group in a cascaded fashion, one after another. The order of the cascaded group link action may be determined by the order in which users joined the linked group. In some embodiments, the leader of the group link connection can move independently, at least temporarily, from the group link connection. Thus, the leader may teleport or goes ahead of the group to investigate a location before moving the entire group to that location.

In one embodiment, the group link controller 136 may implement a group physics simulation, in association with the plurality of simulation servers mentioned above in relation to FIG. 1, to manage group interaction and handle group collisions between users connected in the group link connection. Group physics simulation may be implemented in such a way that the avatars connected to the group link connection are distanced appropriately not to bump into each other, and those avatars can be automatically repositioned when a group movement would cause them to bump into objects or other avatars not connected to the group link connection.

Figure 4:
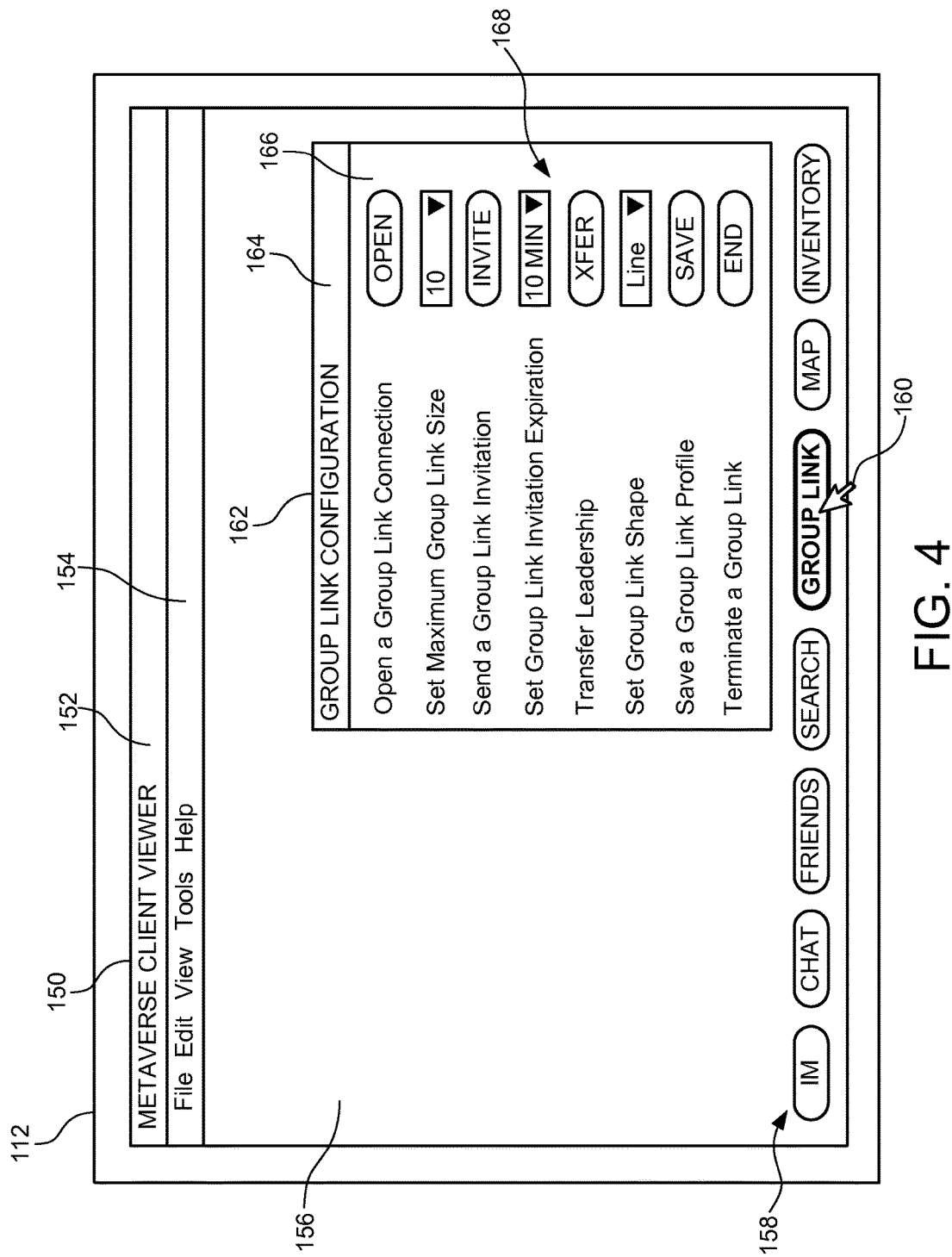
FIG. 4 depicts a schematic diagram of one embodiment of a group link configuration interface for use with the metaverse client viewer FIG. 2.

FIG. 4 depicts a schematic diagram of one embodiment of a group link configuration interface for use with the metaverse client viewer 110 FIG. 2. In particular, the metaverse client viewer 150 shows the group link configuration interface 162 within a graphical user interface (GUI) for display on a display device 112. It should be noted that other embodiments of the group link configuration interface 162 may be integrated with existing or new interfaces that are used to display related information.

The illustrated metaverse client viewer 150 includes a title bar 152 to show a title of the metaverse client viewer 150, a menu bar 154 to show possible menu selections within the metaverse client viewer 150, a viewing space 156 to show a metaverse within the metaverse client viewer 150, a plurality of metaverse client viewer control buttons 158, including a Group Link button, and the group link configuration interface 162 to show a plurality of group link configuration options within the metaverse client viewer 150. The illustrated metaverse client viewer 150 also depicts a cursor 160 on the Group Link control button, which, in one embodiment, opens the group link configuration interface 162.

The illustrated group link configuration interface 162 includes a title bar 164 to show a title of the group link configuration interface 162, a group link configuration viewing space 166 to show a plurality of group link configuration options, and a plurality of group link configuration control buttons 168, which may include a drop down menu, a checkbox, a radio button, a single-click button, among other possible group link configuration control buttons 168. Other embodiments may include fewer or more group link configuration options.

The illustrated group link configuration options include Open a Group Link Connection, Set Maximum Group Link Size, Send a Group Link Invitation, Set Group Link Invitation Expiration, Transfer Leadership, Set Group Link Shape, Save a Group Link Profile, and Terminate a Group Link. Thus, a leader of a group link connection may configure a profile of the group link connection according to the settings selected by the leader through the group link configuration interface 162. In some embodiments, the profile of the group link connection may then be saved for later use through the same group link configuration interface 162. Details of these group link configuration options are configured to operate in substantially the same manner described above in relation to FIG. 3. Details of the Transfer Leadership option are described in further detail in relation to FIG. 8.

Figure 5:
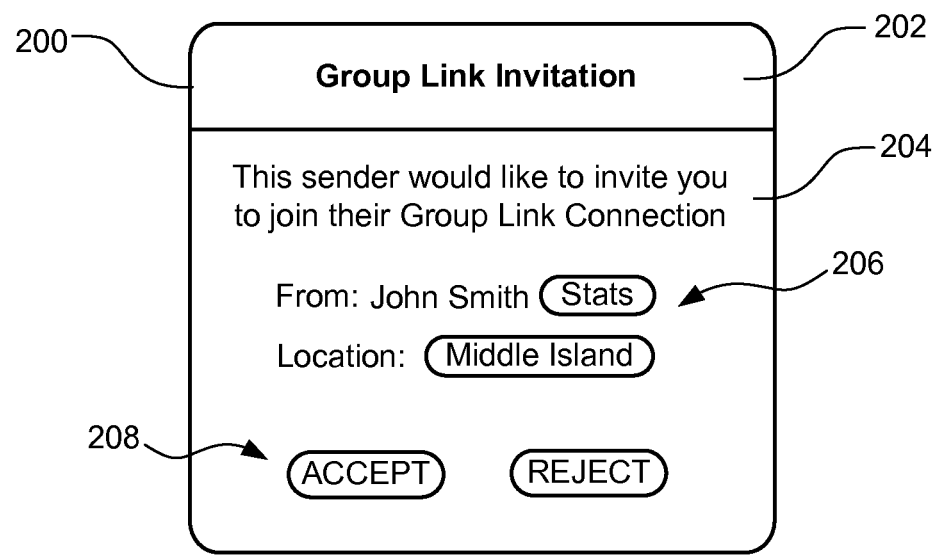
FIG. 5 depicts a schematic diagram of one embodiment of a group link invitation interface for use with the metaverse client viewer of FIG. 2.

FIG. 5 depicts a schematic diagram of one embodiment of a group link invitation interface 200 for use with the metaverse client viewer 110 of FIG. 2. In particular, the group link invitation interface 200 shows the details generated by the group link configuration interface 162 within a graphical user interface (GUI) for display on a display device 112, in order to invite a user to join a linked group. It should be noted that other embodiments of the group link invitation interface 200 may be integrated with existing or new interfaces that are used to display related information.

The illustrated group link invitation interface 200 includes a title bar 202 to show a title of the group link invitation interface 200, a group link invitation message body 204 to show the details of the group link invitation, such as name and location details 206 of the user that sent the group link invitation, as well as group link invitation control buttons 208. The user that received the group link invitation can click an Accept button to accept the invitation and join the linked group, and a Reject button to reject the invitation and not join the linked group. The name and location details 206 may also include control buttons in order to review more information about the user that sent the group link invitation, as well as a button to view a map of where the user that sent the group link invitation currently is, or even a live view of the user that sent the group link invitation.

Figure 6:
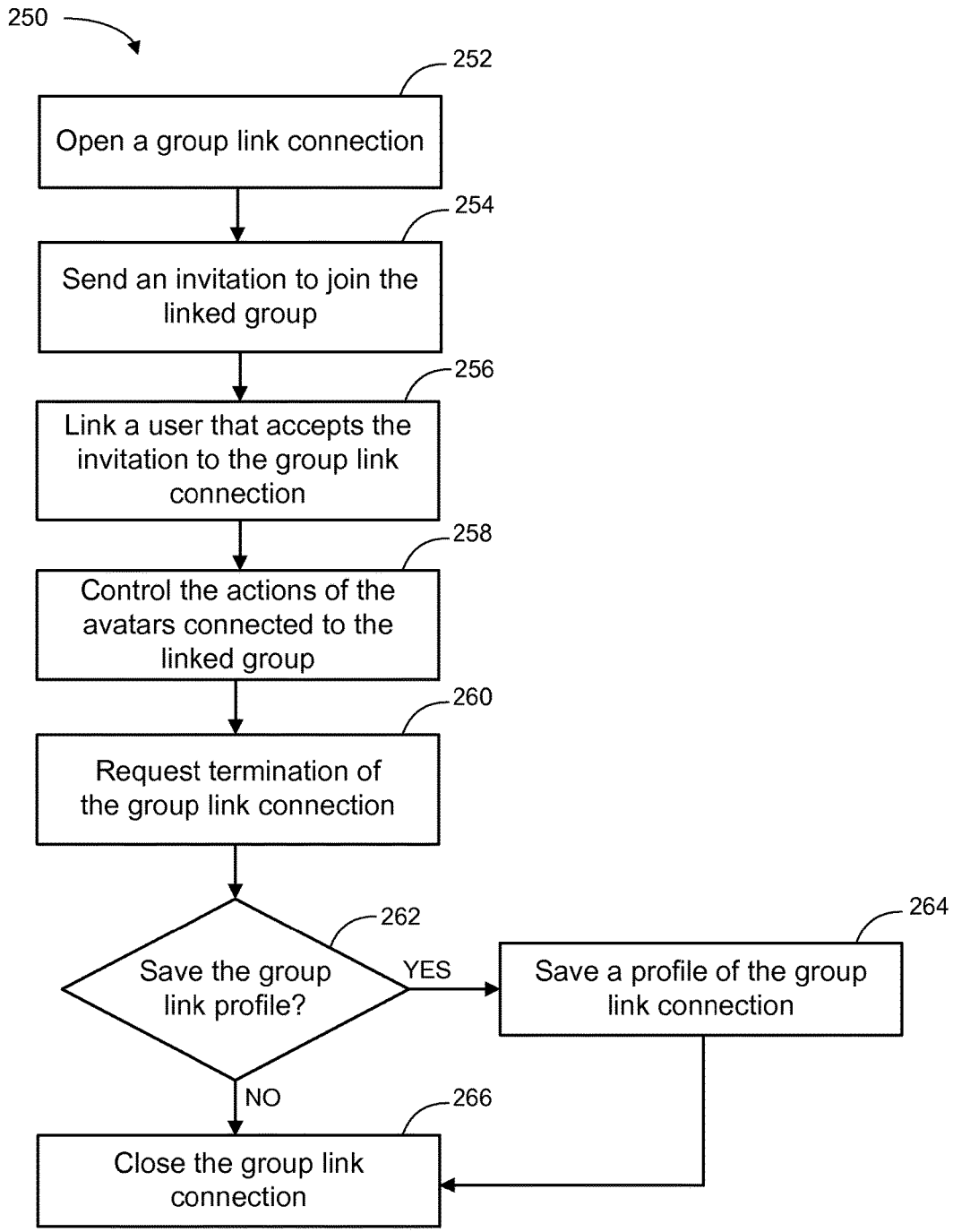
FIG. 6 depicts a schematic flow chart diagram of one embodiment of a group link connection method for use with the group link engine of FIG. 3.

FIG. 6 depicts a schematic flow chart diagram of one embodiment of a group link connection method 250 for use with the group link engine 132 of FIG. 3. For ease of explanation, the group link connection method 250 is described with reference to the group link engine 132 of FIG. 3. However, some embodiments of the group link connection method 250 may be implemented with other group link engines. Additionally, the group link connection method 250 is described in conjunction with the group link interface 120 of FIG. 2, but some embodiments of the group link connection method 250 may be implemented with other group link interfaces.

In the illustrated group link connection method 250, the group link configuration engine 134 opens 252 a group link connection. A user that requests to open the group link connection is designated a leader of the group link connection. The leader of the group link connection may then invite other users to join the linked group. In response to a request from the leader, the group link configuration engine 134 sends 254 a group link invitation to a user, selected by the leader, to join the linked group. The user that receives the group link invitation may then accept the group link invitation. The group link configuration engine 134 then links 256 the user that accepts the group link invitation to the group link connection.

In some embodiments, the leader of the group link connection may then control 258 functions of the linked group by interfacing the group link controller 136 through the group link interface 120 on the leader's client computer 102. Functions of the linked group that the leader controls include those group link actions mentioned above, such as group walking, group flying, group teleporting, and group gesturing. At some point, the leader may request 260 to close the group link connection. The links between avatars connected in the group link connection are then terminated. The group link configuration engine 134 may then prompt the leader to save the group link connection profile, as described above. The leader then determines 262 if the group link connection profile is saved before closing the group link connection, and if so, the group link configuration engine 134 saves the group link connection profile, then closes the group link connection. Otherwise, the group link configuration engine 134 closes the group link connection.

In one embodiment, the group link configuration engine 134 saves the group link connection profile on the electronic memory device 116 or some other type of storage device coupled to the client computer 102 of the leader or any other user connected to the group link connection. Likewise, the group link configuration engine 134 may save the group link connection profile on the metaverse server 104 and one or more client computers 102. In some embodiments, the leader initiates saving the group link connection profile through the group link configuration interface 162 independent of the request to close the group link connection.

For example, a user in the metaverse may be an owner of a virtual store in the metaverse. Another user may enter the virtual store and, perhaps being new to the metaverse application 130, may experience usability problems with the stores interface. The owner of the virtual store may open a group link connection and invite the other user to connect, so that the owner of the virtual store may show the other user around the store and show them the proper and full usability of the virtual store's interface. Details of the tour offered by the owner of the virtual store may then be saved as a group link connection profile, for example, both on the owner's client computer 102 and the other user's client computer 102 for future reference. In some embodiments, the ability to offer guided tours using the group link connection functionality may be used to generate income by providing the tour as a service that is available for purchase by a consuming user.

Figure 7:
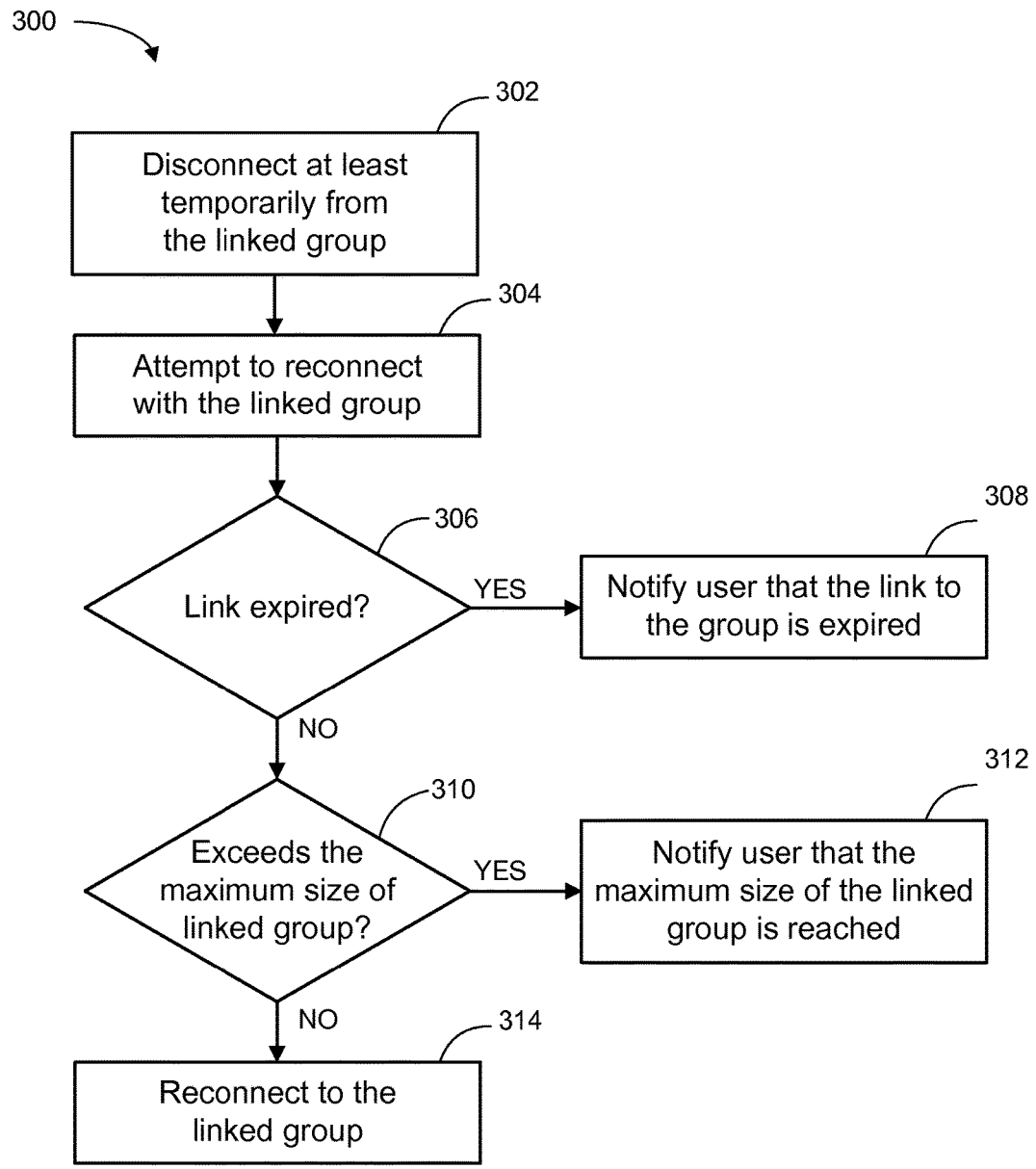
FIG. 7 depicts a schematic flow chart diagram of one embodiment of a group link reconnection method for use with the group link engine of FIG. 3.

FIG. 7 depicts a schematic flow chart diagram of one embodiment of a group link reconnection method 300 for use with the group link engine 132 of FIG. 3. For ease of explanation, the group link reconnection method 300 is described with reference to the group link engine 132 of FIG. 3. However, some embodiments of the group link reconnection method 300 may be implemented with other group link engines. Additionally, the group link reconnection method 300 is described in conjunction with the group link connection method 250 of FIG. 6, but some embodiments of the group link reconnection method 300 may be implemented with other group link connection methods.

In the illustrated group link reconnection method 300, a user connected to the group link connection disconnects 302 at least temporarily from the linked group. After spending a certain amount of time disconnected from the group link connection, the user may then attempt 304 to reconnect with the linked group. As described above in relation to FIG. 3, a leader of the group link connection may configure a profile of the group link connection through the group link configuration interface 162, such as setting a group link invitation expiration and setting a maximum group size limit.

The group link configuration engine 134 then determines whether the expiration of the group link invitation associated with the user that disconnected from the group link connection is expired, and if so, the group link configuration engine 134 then notifies 308 the user that disconnected from the group link connection that the user's link to the group link connection is expired and that the user cannot reconnect with the group link connection. In some embodiments, the group link invitation expiration does not apply to a user that is on a list of the group link connection, as described above in relation to FIG. 3.

Otherwise, the group link configuration engine 134 determines 310 whether the maximum group size limit of the group link connection would be exceeded by reconnecting the user to the group link connection. If so, the group link configuration engine 134 notifies the user that disconnected that the maximum group size limit is reached, and that the user cannot reconnect with the group link connection. Otherwise, the group link configuration engine 134 reconnects the user back to the group link connection.

For example, the group link invitation expiration may apply to the group link invitation of a user that disconnects at least temporarily from the group link connection. When the user that disconnects from the group link connection remains disconnected for a time that exceeds the time of the group link invitation expiration, the user is no longer able to reconnect to the group link connection. Likewise, when the user that disconnects from the group link connection remains disconnected for a time that allows other users to connect to the group link connection such that a maximum group size limit for the group link connection is reached, the user is no longer able to reconnect to the group link connection.

Figure 8:
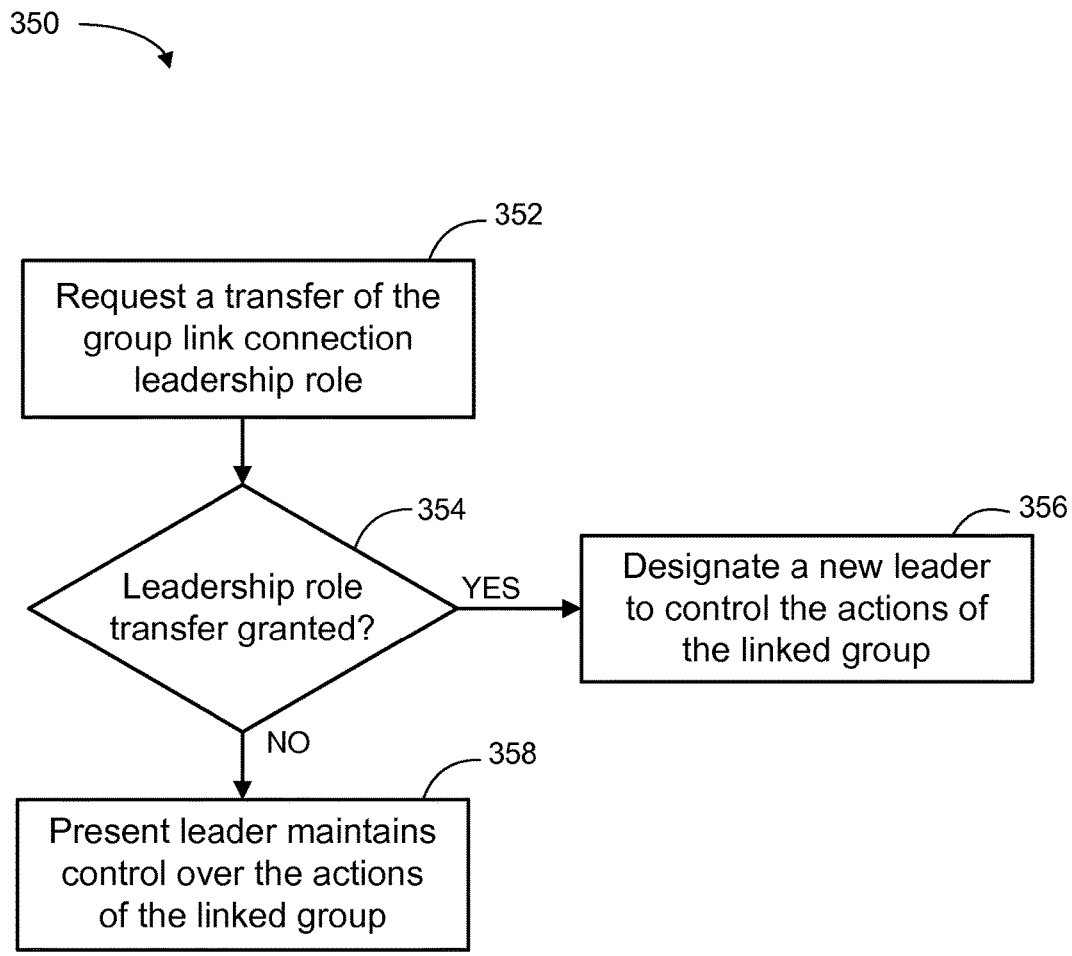
FIG. 8 depicts a schematic flow chart diagram of one embodiment of a group link leader transfer method for use with the group link engine of FIG. 3.

FIG. 8 depicts a schematic flow chart diagram of one embodiment of a group link leader transfer method 350 for use with the group link engine 132 of FIG. 3. For ease of explanation, the group link leader transfer method 350 is described with reference to the group link engine 132 of FIG. 3. However, some embodiments of the group link leader transfer method 350 may be implemented with other group link engines. Additionally, the group link leader transfer method 350 is described in conjunction with the group link connection method 250 of FIG. 6, but some embodiments of the group link leader transfer method 350 may be implemented with other group link connection methods.

In the illustrated group link leader transfer method 350, a user connected to the group link connection requests 352 a transfer of the designation as leader of the group link connection from the present leader of the group link connection. In some embodiments, the user that makes the request to transfer the designation as leader of the group link connection in order to receive the designation. In other embodiments, the user makes the request to transfer the designation as leader of the group link connection in order to transfer the designation as leader to a different user connected to the group link connection, apart from the user that makes the request and the present leader.

The leader of the group link connection then determines 354 whether to transfer the designation as leader of the group link connection, and if so, the group link configuration engine 134 then designates 356 a new leader to lead the group link connection and control the plurality of group link actions, as described above. Otherwise, the present leader maintains 358 control over the plurality of group link actions and continues to lead the group link connection. In some embodiments, an original leader may transfer a temporary designation as leader of the group link connection to another user. The original leader maintains overall control of the group link connection in that the original leader may retransfer the designation as leader of the group link connection at any time, wherein the designation as leader of the group link connection returns to the original leader.

Embodiments of the system and method of the group link connection process described can have a real and positive impact on improving the usability of a metaverse application 130, by providing a process of grouping a number of avatars in the metaverse to travel as a group in order to prevent straying of individual avatars that intend to remain together as a group, and giving overall control of the group movements and gestures to a leader of the group link connection. Additionally, some embodiments facilitate improving usability of interfaces in the metaverse, by providing a process to demonstrate the usability of a certain interface to a user in the metaverse that is unfamiliar with the given interface. Thus, by allowing individuals to form and remain as a group, embodiments of the group functionality described herein can reduce or eliminate the possibility that a user will be lost from the group.

It should also be noted that at least some of the operations for the group link connection method 250, the group link reconnection method 300, and the group link leader transfer method 350 may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to open a group link connection in response to a request from a user, an operation to configure a group link connection profile, and an operation to control a plurality of group link actions. In one embodiment, the user is designated as a leader of the group link connection, and the leader may initiate one of a plurality of group link actions to control an action of the linked group.

Another embodiment of the computer program product includes an operation to send a group link invitation from the leader of the linked group to the other user to join the linked group, an operation to link the other user to the group link connection in response to an acceptance by the other user of the group link invitation to join the linked group, and an operation to set a group link invitation expiration to limit an acceptance period of the group link invitation. Another embodiment of the computer program product includes an operation to set a maximum group size limit to maintain a limit on a maximum number of users allowed to join the linked group.

Another embodiment of the computer program product includes an operation to configure a group link connection profile. The group link connection profile includes a list of the plurality of linked users of the linked group. Another embodiment of the computer program product includes an operation to terminate the group link connection. Another embodiment of the computer program product includes an operation to control group movements, including gestures. Another embodiment of the computer program product includes an operation to control the other avatar of the other user to avoid an obstacle in the path of the other avatar of the other user.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A metaverse system comprising:
   a client computer coupled to a network;
   a metaverse server coupled to the client computer, the metaverse server to host a metaverse application;
   a group link engine coupled to the metaverse server, the group link engine to open a group link connection in response to a request from a user to open the group link connection, wherein a linked group associated with the group link connection comprises at least two linked users, and at least one of the linked users is designated as a leader of the linked group associated with the group link connection and at least one user of the linked group is designated as a follower of the linked group associated with the group link, wherein each of the at least two linked users is associated with a different avatar, the group link engine comprising:
      a group link controller to allow the user designated as the leader to control an action of the avatar of the at least one follower based on an action of the leader to control the avatar of the leader, wherein the action of the avatar of the at least one follower mimics action of the avatar of the leader to control the avatar of the leader without input by the at least one follower, wherein the action of the avatar of the at least one follower can be viewed separately from the avatar associated with the leader,
   wherein the group movement comprises a delayed teleport, wherein the leader teleports to a new location apart from a remainder of the linked group, and after a predetermined delay, the remainder of the avatars in the linked group are then teleported to the new location without input from the users in the linked group not designated as leader.

2. The metaverse system of claim 1, the group link engine further comprising a group link configuration engine coupled to the group link controller, the group link configuration engine to send a group link invitation to the second user to join the linked group.

3. The metaverse system of claim 2, wherein the group link configuration engine terminates the group link invitation in response to a user's rejection of the group link invitation.

4. The metaverse system of claim 3, wherein the group link configuration engine is further configured to disconnect temporarily a linked user from the group link connection and reconnect the linked user, that was temporarily disconnected from the group link connection, to the linked group.

5. The metaverse system of claim 1, wherein the group link controller stores a plurality of group movements on a storage device in response to a request from a user in a linked group to save the plurality of group movements.

6. The metaverse system of claim 1, the group link controller further configured to control a group movement in response to an input command by the leader of the linked group, wherein the group movement comprises one or more of:
   a cascaded group movement, wherein a user in the linked group is ranked in a predetermined order to allow a movement initiated by the leader to be performed by the avatar of the leader first, and then after a predetermined delay for each avatar, each additional avatar separately performs that movement according to the rank of each user in the linked group not designated as leader without input from the users in the linked group not designated as leader; and a verified teleport, wherein the leader teleports to a new location apart from the remainder of the linked group, and the remainder of the avatars of the linked group teleport to the new location in response to a verification by the leader to travel to the new location without input from the users in the linked group not designated as leader.

7. The metaverse system of claim 6, wherein the group link controller stores a plurality of group movements on a storage device in response to a request from a user in a linked group to save the plurality of group movements.

8. The metaverse system of claim 1, wherein the group link controller allows the second user to decline the action that one of the users designated as the leader initiates to control the avatar of the second user.

9. A method comprising:

opening a group link connection in response to a request from a user to open the group link connection, wherein a linked group associated with the group link connection comprises at least two linked users, and at least one of the linked users is designated as a leader of the linked group associated with the group link connection; and controlling an action of a plurality of avatars of the linked group associated with the group link connection in response to an input command by one of the users designated as the leader of the linked group, wherein the action of one or more avatars of the linked group not designated as the leader mimics an action of the avatar of the user designated as the leader without input by the users of the linked group not designated as the leader, the action of the avatar of the user designated as the leader in response to the input command, wherein the action of each of the plurality of avatars can be viewed separately, wherein the group movement comprises a delayed teleport, wherein the leader teleports to a new location apart from a remainder of the linked group, and after a predetermined delay, the remainder of the avatars in the linked group are then teleported to the new location without input from the users in the linked group not designated as leader.

10. The method of claim 9, further comprising:
sending a group link invitation to another user to join the linked group;
linking the other user to the group link connection in response to the other user accepting the group link invitation to join the linked group; and
saving a group link connection profile.

11. The method of claim 9, further comprising:
disconnecting at least temporarily a linked user from the group link connection; and
reconnecting the linked user, that temporarily disconnected from the group link connection, to the linked group.

12. The method of claim 9, further comprising:
requesting a transfer of the designation of the user as the leader of the group link connection; and
transferring the designation of at least one of the users designated as the leader of the group link connection to another user of the group link connection.

13. An apparatus, comprising:
means for establishing a linked group of metaverse users, each metaverse user associated with an avatar of a metaverse application, wherein one of the metaverse users is designated as a leader of the linked group; and
means for controlling an action of all of the avatars of the linked group in response to an action of the avatar associated with the leader of the linked group of metaverse users, wherein the action of one or more avatars of the linked group not designated as the leader mimics the action of the avatar of the user designated as the leader designated as the leader without input by the metaverse users not designated as the leader, the action of the avatar of the user designated as the leader in response to the input command, wherein the action of each avatar of the linked group can be viewed separately, wherein the group movement comprises a delayed teleport, wherein the leader teleports to a new location apart from a remainder of the linked group, and after a predetermined delay, the remainder of the avatars in the linked group are then teleported to the new location without input from the users in the linked group not designated as leader.

\* \* \* \* \*